(12) United States Patent
Kakii

(10) Patent No.: US 9,330,403 B2
(45) Date of Patent: May 3, 2016

(54) DELIVERY CONTROL APPARATUS, INFORMATION DELIVERY SYSTEM, AND INFORMATION DELIVERY METHOD

(71) Applicant: Hiroshi Kakii, Tokyo (JP)

(72) Inventor: Hiroshi Kakii, Tokyo (JP)

(73) Assignee: RICOH COMPANY, LIMITED, Tokyo (JP)

(*) Notice: Subject to any disclaimer, the term of this patent is extended or adjusted under 35 U.S.C. 154(b) by 0 days.

(21) Appl. No.: 14/632,264

(22) Filed: Feb. 26, 2015

(65) Prior Publication Data

US 2015/0254735 A1    Sep. 10, 2015

(30) Foreign Application Priority Data

Mar. 7, 2014   (JP) ................. 2014-044950
Jan. 6, 2015   (JP) ................. 2015-001123

(51) Int. Cl.
*G06F 17/00*   (2006.01)
*G06Q 30/02*   (2012.01)
*H04L 29/08*   (2006.01)

(52) U.S. Cl.
CPC ............ *G06Q 30/0277* (2013.01); *H04L 67/02* (2013.01)

(58) Field of Classification Search
CPC .................................................. G06Q 30/0277
USPC ........................................................... 235/375
See application file for complete search history.

(56) References Cited

U.S. PATENT DOCUMENTS

| | | | | |
|---|---|---|---|---|
| 7,831,199 | B2* | 11/2010 | Ng ........................ | H04L 67/06 455/3.01 |
| 8,027,954 | B2* | 9/2011 | Malcolm .......... | G06F 17/30035 707/621 |
| 2007/0214182 | A1* | 9/2007 | Rosenberg ........ | G06F 17/30749 |
| 2013/0121620 | A1 | 5/2013 | Suzuki | |

FOREIGN PATENT DOCUMENTS

| | | |
|---|---|---|
| JP | 2013-105267 | 5/2013 |
| JP | 2013-125147 | 6/2013 |
| JP | 2013-161360 | 8/2013 |

* cited by examiner

*Primary Examiner* — Seung Lee
(74) *Attorney, Agent, or Firm* — Oblon, McClelland, Maier & Neustadt, L.L.P.

(57) ABSTRACT

A delivery control apparatus is connected to an electronic apparatus. The delivery control apparatus includes: an acquiring unit that acquires electronic apparatus information concerning the electronic apparatus from the electronic apparatus; a selecting unit that selects delivery information corresponding to the electronic apparatus information out of one or more pieces of delivery information; and a delivery processing unit that executes at least one of processing of delivering the selected delivery information to the electronic apparatus and processing of storing access information to the selected delivery information.

6 Claims, 20 Drawing Sheets

FIG.9

| DEVICE ID: 1003 |
|---|
| INSTALLATION SITE: APPAREL OFFICE |
| LANGUAGE USED: ENGLISH |
| SIGNAGE DISPLAY CAPABILITY: 640×400, 40 TWO-BYTE CHARACTERS (250 CHARACTERS BY SCROLLING) |

FIG.10

| CONDITION TO DELIVER CATALOG A |
|---|
| [FIXED INFORMATION]<br>·INSTALLATION SITE: APPAREL OFFICE<br>·LANGUAGE USED: ENGLISH<br>·SIGNAGE DISPLAY CAPABILITY: 640X400 OR HIGHER |
| [VARIABLE INFORMATION]<br>·NUMBER OF COPIES USED: 1000 COPIES/MONTH OR LESS<br>·COLOR USED: RATIO OF COLOR IS 60% OR HIGHER<br>·PAPER SIZE USED: NOT ASKED |

| ADVERTISING CONTENT | NEW MODEL A | NEW MODEL B | NEW MODEL C |
|---|---|---|---|
| NUMBER OF COPIES USED | SMALL SCALE MODEL 99 COPIES/MONTH OR LESS | MEDIUM SCALE MODEL 100 TO 9999 COPIES/MONTH | LARGE SCALE MODEL 10000 COPIES/MONTH OR MORE |

FIG.13

| POINTER | DEVICE ID |
|---------|-----------|
| 1 | 1003 |
| 2 | 1124 |
| 3 | 2578 |
| 4 | 2593 |
| 5 | 2839 |
| 6 | 3020 |

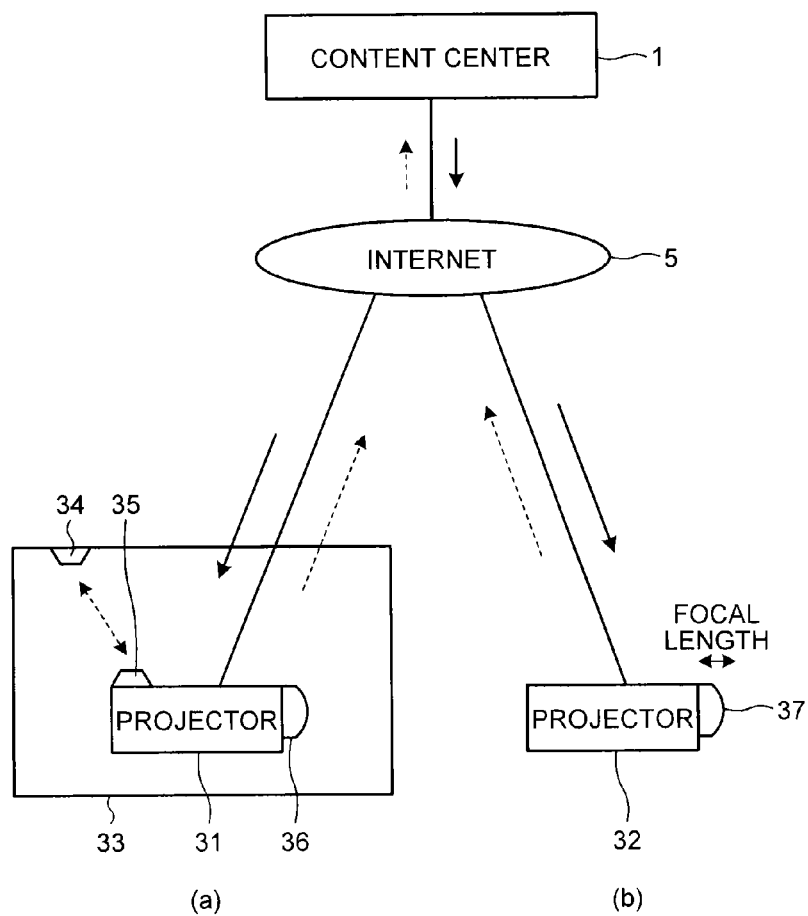

FIG.16

| DEVICE ID: 2003 |
| --- |
| PAULOWNIA ROOM: 2 TIMES |
| PINE ROOM: 3 TIMES |
| BUSH CLOVER ROOM: 2 TIMES |
| CEDAR ROOM: 20 TIMES |

FIG.17

| MEETING ROOM SIZE | SMALL | MEDIUM | LARGE |
| --- | --- | --- | --- |
| FOCAL LENGTH (LENS ROTATION ANGLE) | 0 TO 29 DEGREES | 30 TO 89 DEGREES | 90 DEGREES OR GREATER |

| DEVICE ID: 2003 |
|---|
| 0 DEGREES TO 29 DEGREES: 20 TIMES |
| 30 DEGREES TO 89 DEGREES: 3 TIMES |
| 90 DEGREES OR GREATER: 2 TIMES |

FIG.23

| DEVICE ID: 1003 |
|---|
| CONTENT A: http://ricoh.com/data/A.xml |
| CONTENT V: http://ricoh.com/data/V.xml |
| CONTENT Z: http://ricoh.com/data/Z.xml |

FIG.28

```
<header>
   <startdate>
      2014-01-01
   </startdate>
   <enddate>
      2014-01-15
   </enddate>
</header>
<body>
   <text>
      NEW YEAR SALE HAS STARTED.
      (UTF-8 FORMAT)
   </text>
   <img>
      STILL IMAGE DATA (base64 FORMAT)
   </img>
</body>
```

DELIVERY CONTROL APPARATUS, INFORMATION DELIVERY SYSTEM, AND INFORMATION DELIVERY METHOD

CROSS-REFERENCE TO RELATED APPLICATIONS

The present application claims priority to and incorporates by reference the entire contents of Japanese Patent Application No. 2014-044950 filed in Japan on Mar. 7, 2014 and Japanese Patent Application No. 2015-001123 filed in Japan on Jan. 6, 2015.

BACKGROUND OF THE INVENTION

1. Field of the Invention

The present invention relates to an information delivery system, a delivery control apparatus, and an information delivery method that deliver content to an apparatus.

2. Description of the Related Art

Signage systems have become widely used. It has been known that the delivery using a signage display is effective, in particular, for advertisements, notices, and others.

In Japanese Patent Application Laid-open No. 2013-161360, disclosed has been a system that determines, by deriving the preference of a viewer of signage display from the information on a portable product at a place, and determining the display content from the positional relation of a signage display apparatus and the person who holds the portable product, for the purpose of effectively performing digital signage display.

However, with previous signage systems, because the signage information providers have sent out the information unilaterally, it has been not uncommon that the content that is not necessarily suitable for the viewer is displayed.

There is a need to provide an information delivery system that can provide the information useful for viewers more effectively.

SUMMARY OF THE INVENTION

It is an object of the present invention to at least partially solve the problems in the conventional technology.

A delivery control apparatus is connected to an electronic apparatus. The delivery control apparatus includes: an acquiring unit that acquires electronic apparatus information concerning the electronic apparatus from the electronic apparatus; a selecting unit that selects delivery information corresponding to the electronic apparatus information out of one or more pieces of delivery information; and a delivery processing unit that executes at least one of processing of delivering the selected delivery information to the electronic apparatus and processing of storing access information to the selected delivery information.

An information delivery system includes: a delivery control apparatus; and an electronic apparatus. The delivery control apparatus includes: an acquiring unit that acquires electronic apparatus information concerning the electronic apparatus from the electronic apparatus, a selecting unit that selects delivery information corresponding to the electronic apparatus information out of one or more pieces of delivery information, and a delivery processing unit that executes at least one of processing of delivering the selected delivery information to the electronic apparatus and processing of storing access information to the selected delivery information. The electronic apparatus includes: a transmitting unit that transmits the electronic apparatus information to the delivery control apparatus, a receiving unit that receives the delivery information from the delivery control apparatus, and a display processing unit that displays the received delivery information on a display unit.

An information delivery method is executed in an information delivery system that includes a delivery control apparatus and an electronic apparatus. The information delivery method includes: transmitting, by the electronic apparatus, electronic apparatus information to the delivery control apparatus; acquiring, by the delivery control apparatus, electronic apparatus information concerning the electronic apparatus from the electronic apparatus; selecting, by the delivery control apparatus, delivery information corresponding to the electronic apparatus information out of one or more pieces of delivery information; executing, by the delivery control apparatus, at least one of processing of delivering the selected delivery information to the electronic apparatus and processing of storing access information to the selected delivery information; receiving, by the electronic apparatus, the delivery information from the delivery control apparatus; and displaying, by the electronic apparatus, the received delivery information on a display unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a table illustrating a specific example of fixed information;

FIG. 10 is a table illustrating an example of a delivery condition;

FIG. 13 is a table illustrating an example of a list of extracted device IDs;

FIG. 14 is a schematic diagram illustrating the overall configuration of a signage system according to a second embodiment of the present invention;

FIG. 15 is a table illustrating an example of determining information for determining a meeting room for a normal projector;

FIG. 16 is a table illustrating an example of electronic apparatus information transmitted from the normal projector;

FIG. 17 is a table illustrating an example of determining information for determining a meeting room for a short-focus projector;

FIG. 23 is a table illustrating an example of a device ID list (corresponding information);

FIG. 28 is a diagram illustrating an example of the data structure of content.

DETAILED DESCRIPTION OF THE PREFERRED EMBODIMENTS

The following describes in detail exemplary embodiments with reference to the accompanying drawings.

As in the foregoing, with a conventional signage system, there have been situations in which the information useful for viewers cannot be provided. The reasons for this include that, because of the characteristics of the signage that it is primarily for advertisement display, it is not interactive, or that the information provider cannot identify the viewers. This problem has long been recognized in a broadcast system such as television. In television, broadcasting advertisements relevant to the range of viewing audiences of the main broadcast content normally has achieved an effect. In contrast, in signage, there has been a problem in that it becomes more difficult to deliver the information useful for the viewers in a timely manner as a range of viewers widened. Changing the viewpoint, in broadcast, because the basics of broadcast are to make a plurality of viewers watch the same content at the same time, making each viewer see a different content at the same time has been difficult as a system.

As for the advertisement, there includes an advertisement such as one that recommends an alternate apparatus of a currently using apparatus (for example, a multi-function peripheral (MFP)), for example. Conventionally, in an MFP alone, it can be determined by human power, by looking at its log, whether it is better to make the MFP be used continuously or to recommend another MFP. However, when determining that it is better to replace the MFP with another MFP, it needs to be determined by considering not only the price of the apparatus, but also cost impacts and others after the replacement. Consequently, it has also been difficult to design a network apparatus such as an MFP so as to display advertisements or the like after executing all those determinations by the apparatus alone.

A signage system (an information delivery system) in a first embodiment refers to an actual operating history of an apparatus and/or the like, and controls what content to provide and when to provide the content. Thus, the information useful for viewers can be provided at more appropriate timing and more effectively.

Figure 1:
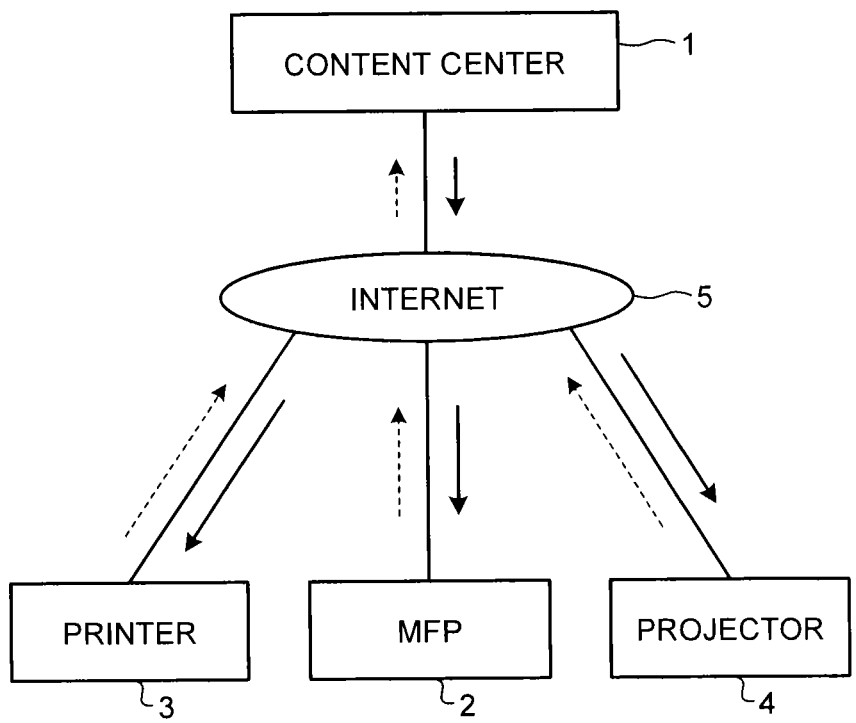
FIG. 1 is a schematic diagram illustrating the overall configuration of a signage system according to a first embodiment of the present invention.

FIG. 1 is a schematic diagram illustrating an example of the overall configuration of the signage system according to the first embodiment. The signage system is configured such that a content center 1, an MFP 2, a printer 3, and a projector 4 are connected to one another via the Internet 5.

The content center 1 serves as a delivery control apparatus that centrally controls (stores) content (delivery information) delivered to signage. The content center 1 delivers the content to each electronic apparatus via the Internet 5. In the first embodiment, as an example of the content to be delivered, advertisement information and catalogs (hereinafter, referred to as content or advertising content) are used for explanation.

The MFP 2, the printer 3, and the projector 4 are examples of electronic apparatuses that display content on various display media such as a display panel, a display device, and a projection screen (hereinafter, referred to as signage). Any electronic apparatus other than the foregoing may be used as long as the apparatus can display the content. Each electronic apparatus has a signage function of displaying the content on the signage, and a function of notifying usage information on the electronic apparatus. Recently, a display device such as a smartphone that is linked with the foregoing electronic apparatus has also been able to be used in place of the display panel of the apparatus. In such a case, the smartphone may be handled as a display medium to display the content.

Each electronic apparatus holds unique identification information (a device ID). The content center 1 has functions of taking up electronic apparatus information linked to the device ID at regular intervals (dashed arrows in FIG. 1) to perform remote maintenance management, and delivering a different content for each device ID (solid arrows in FIG. 1).

Figure 2:
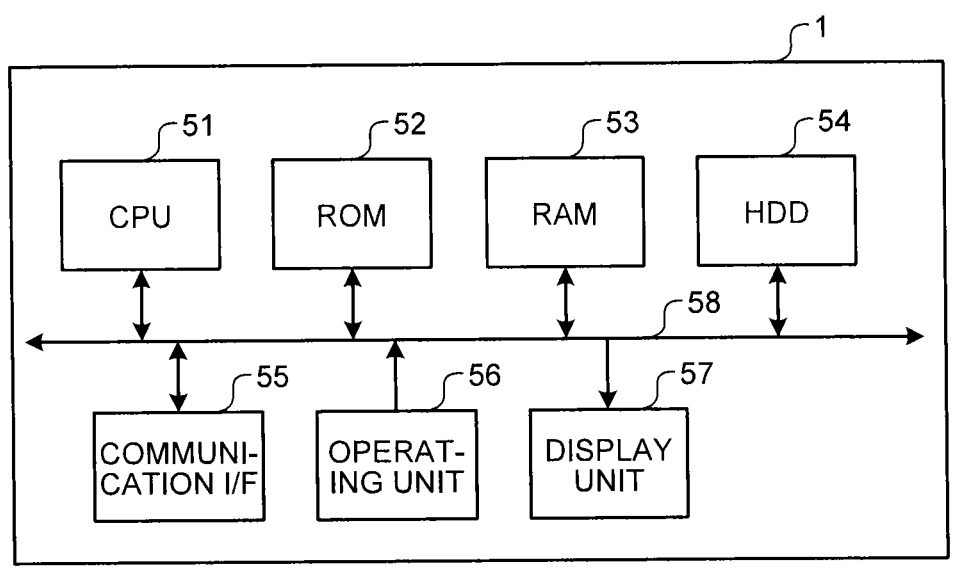
FIG. 2 is a block diagram illustrating an example of the hardware configuration of a content center in the first embodiment.

FIG. 2 is a block diagram illustrating an example of the hardware configuration of the content center 1 in the first embodiment. As illustrated in FIG. 2, the content center 1 includes a central processing unit (CPU) 51, a read only memory (ROM) 52, a random access memory (RAM) 53, a hard disk drive (HDD) 54, a communication interface (I/F) 55, an operating unit 56, and a display unit 57. The various units from the CPU 51 to the display unit 57 are connected to one another via a system bus 58.

The CPU 51 controls the operation of the content center 1. The ROM 52 stores therein data and others necessary for the CPU 51 to execute computer programs. The RAM 53 forms a work area and others for the CPU 51. The HDD 54 stores therein data such as programs that the CPU 51 executes. The communication I/F 55 is an interface for the communication using a network such as the Internet 5. The operating unit 56 is an input operation device such as a keyboard and a mouse to input a variety of information. The display unit 57 is a display device such as a liquid crystal display to display a variety of information. A touch panel in which the operating unit 56 and the display unit 57 are integrally combined, or the like may be used.

Figure 3:
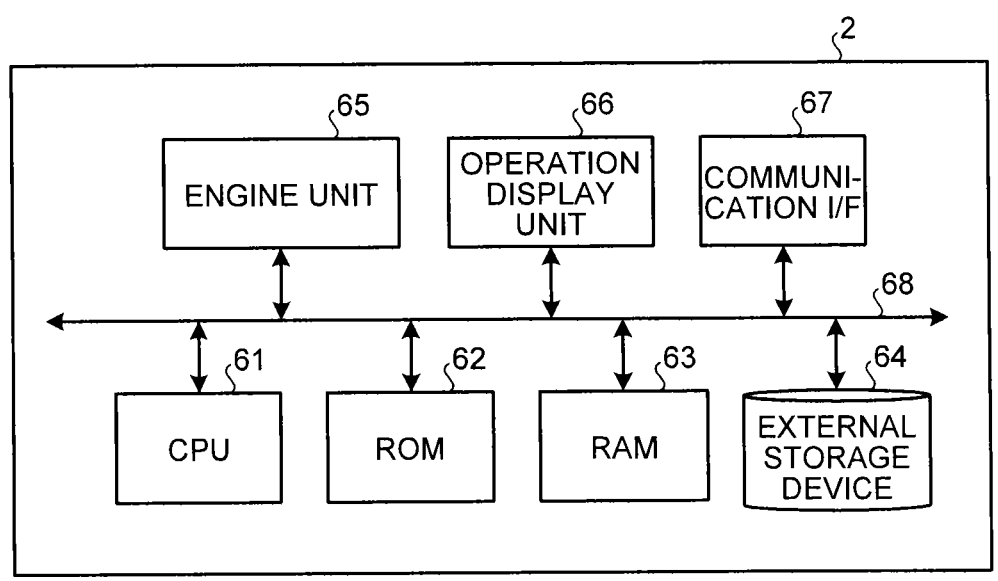
FIG. 3 is a block diagram illustrating an example of the hardware configuration of an MFP in the first embodiment.

FIG. 3 is a block diagram illustrating an example of the hardware configuration of the MFP 2 in the first embodiment. As illustrated in FIG. 3, the MFP 2 includes a CPU 61, a ROM 62, a RAM 63, an external storage device 64, an engine unit 65, an operation display unit 66, and a communication I/F 67. The various units from the CPU 61 to the communication I/F 67 are connected via a bus 68 to be able to communicate with one another.

The CPU 61 is an arithmetic device that controls the operation of the MFP 2 overall. The ROM 62 is a non-volatile storage device that stores therein programs for the MFP 2.

The RAM 63 is a volatile storage device that is used as a work area for the calculation of the CPU 61.

The external storage device 64 is a device to store therein a variety of data such as image data and print data. The external storage device 64 is an HDD or a solid state drive (SSD), for example.

The engine unit 65 is a hardware device that implements a scanner function, a print function, and/or the like. The scanner function is a function to read document data and to generate a scanner image. The print function is a function to perform image processing on a scanner image or on image data transmitted from the outside, and to print a plotter image, which is in a format capable of outputting, onto printing paper.

The operation display unit 66 is a touch panel, for example, and is a device that receives input to the MFP 2 and displays the status of the MFP 2 and/or the like. As in the content center 1, the operation display unit 66 may be configured to be separated into an operating unit and a display unit. Alternatively, as in the foregoing, a portable terminal such as a smartphone may be used in place of the operation display unit 66.

The communication I/F 67 is an interface to communicate data by using a network such as the Internet 5.

The hardware configuration of the printer 3 is the same as that illustrated in FIG. 3, and thus its explanation is omitted.

Figure 4:
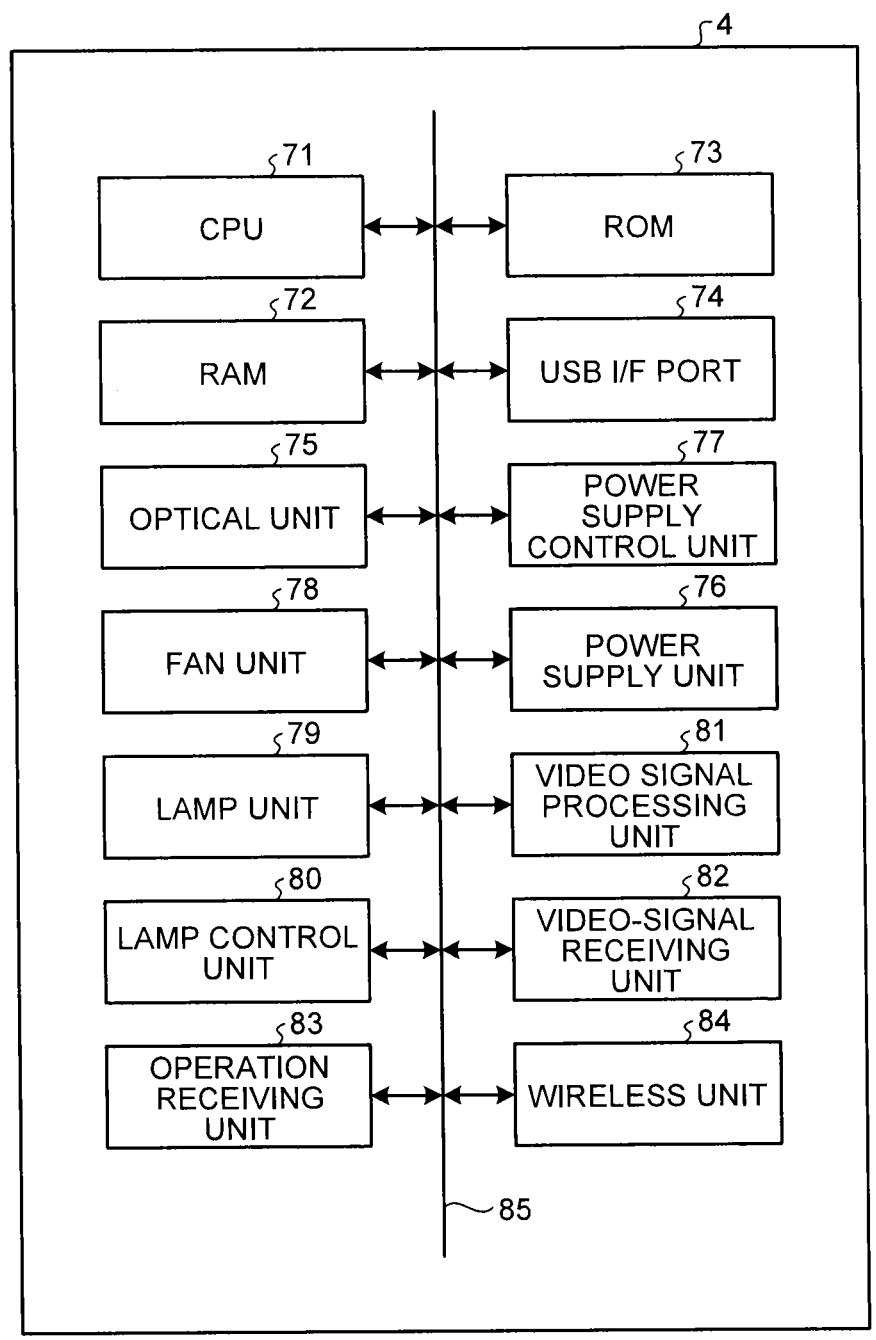
FIG. 4 is a block diagram illustrating an example of the hardware configuration of a projector in the first embodiment.

FIG. 4 is a block diagram illustrating an example of the hardware configuration of the projector 4. The projector 4 includes a CPU 71, a RAM 72, a ROM 73, a USB I/F port 74, an optical unit 75, a power supply unit 76, a power supply control unit 77, a fan unit 78, a lamp unit 79, a lamp control unit 80, a video signal processing unit 81, a video-signal receiving unit 82, an operation receiving unit 83, and a wireless unit 84. The various units from the CPU 71 to the wireless unit 84 are connected to one another via a bus line 85.

The CPU 71 executes a computer program that controls the operation of the projector 4. The RAM 72 constitutes a work area for the CPU 71 and others. The ROM 73 stores therein programs that the CPU 71 executes and data necessary to execute the computer programs. The USB I/F port 74 is a connection port for a USB cable. The optical unit 75 is a portion that creates an image, and in the case of a DLP (registered trademark) projector, it is a DMD (registered trademark) or a color wheel. The DLP is an abbreviation of "digital light processing." The DMD is an abbreviation of "digital micro mirror device."

The power supply unit 76 supplies power to the projector 4. The power supply control unit 77 performs power supply control of the power supply unit 76. The fan unit 78 cools the main body of the projector 4. The lamp unit 79 generates light as a light source. The lamp control unit 80 serves as ballast that controls the lamp unit 79. The video-signal receiving unit 82 is video signal ports for the respective types of video input such as D-subminiature (D-sub), HDMI (registered trademark), and video connectors, for example. The video signal processing unit 81 receives and processes video signals input from the video signal port. The operation receiving unit 83 is an operation key, for example, and receives an operation of a user. The wireless unit 84 receives information from an indicator (such as a pen) by performing, for example, infrared wireless communication, or wireless communication in the communication standard of Bluetooth (registered trademark).

Figure 5:
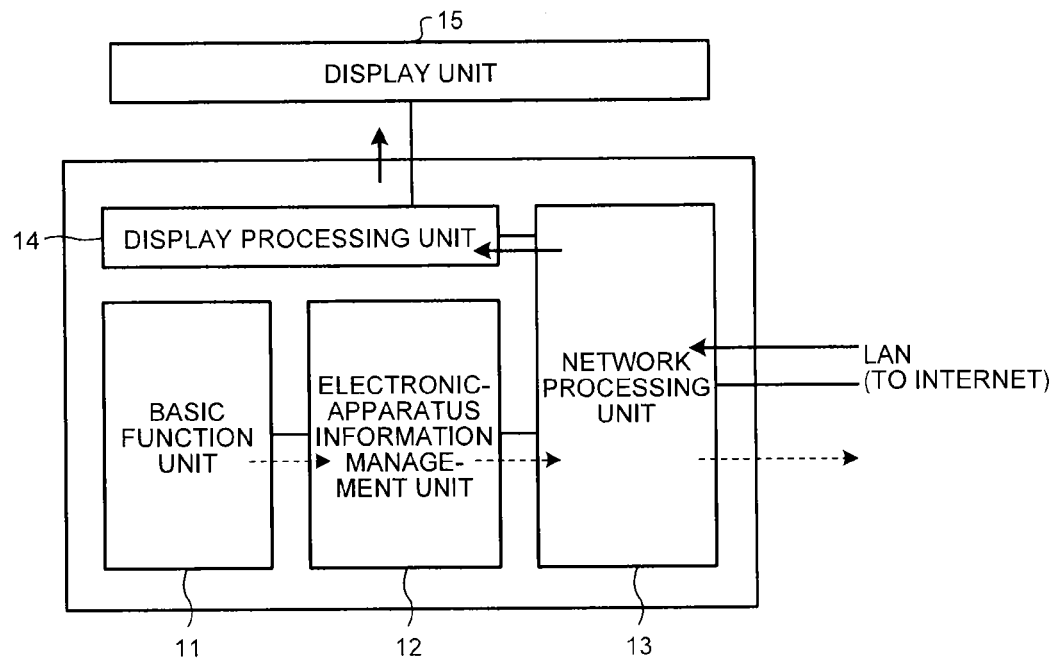
FIG. 5 is a block diagram illustrating the configuration of an electronic apparatus in the first embodiment.

FIG. 5 is a block diagram illustrating an example of the configuration of an electronic apparatus in the first embodiment. The electronic apparatus includes a basic function unit 11, an electronic-apparatus information management unit 12, a network processing unit 13, a display processing unit 14, and a display unit 15.

The basic function unit 11 refers to a function that the apparatus originally has, and in the foregoing examples, it is the portion that operates as the basic function of the MFP 2, the printer 3, or the projector 4. The electronic-apparatus information management unit 12 collects information that varies depending on the use situation of the electronic apparatus, and transmits the information to the content center 1 (a transmitting unit).

The network processing unit 13 notifies, upon receiving a notice request from the electronic-apparatus information management unit 12, the content center 1 of a variety of information via, for example, a local area network (LAN). The network processing unit 13 further receives content transmitted from the content center 1 via the LAN and transfers the content to the display processing unit 14 (a receiving unit).

The display processing unit 14 controls the display of a variety of information (such as content) for the display unit 15. For example, the display processing unit 14 performs display processing on the content received from the content center 1. The display processing unit 14 displays the received content on the display unit 15 after converting the content into a format displayable on the display unit 15, as necessary.

The display unit 15 displays a variety of information such as content. In the case of the MFP 2 or the printer 3, the operation display unit 66 corresponds to the display unit 15. In the case of the projector 4, the projection screen corresponds to the display unit 15. As just described, in the case of the projector 4, the projector 4 may be configured to display the content on an external projection screen or the like, without the display unit 15 being provided internally.

Figure 6:
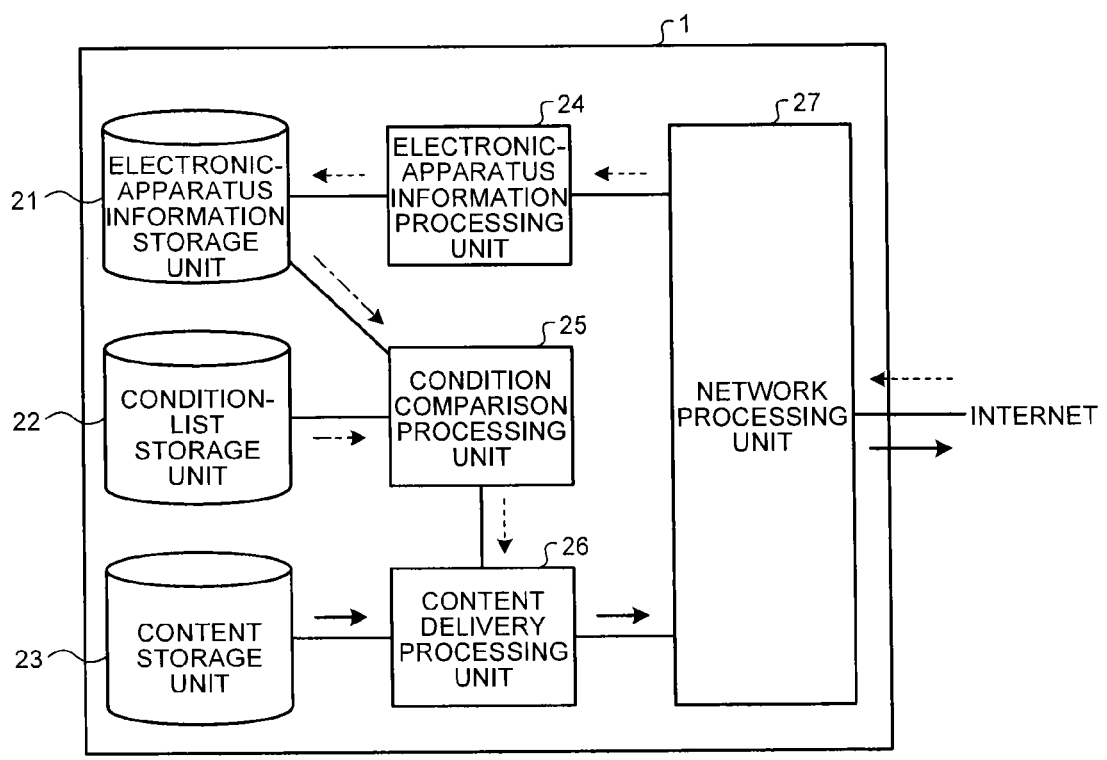
FIG. 6 is a block diagram illustrating the configuration of the content center in the first embodiment.

FIG. 6 is a block diagram illustrating an example of the configuration of the content center 1 in the first embodiment. The content center 1 includes an electronic-apparatus information storage unit 21, a condition-list storage unit 22, a content storage unit 23, an electronic-apparatus information processing unit 24, a condition comparison processing unit 25, a content delivery processing unit 26, and a network processing unit 27. The solid arrows in FIG. 6 represent the flow of content delivery, the dashed arrows represent the flow of electronic apparatus information, and the dashed-dotted arrows represent the flow of internal information.

Figure 7:
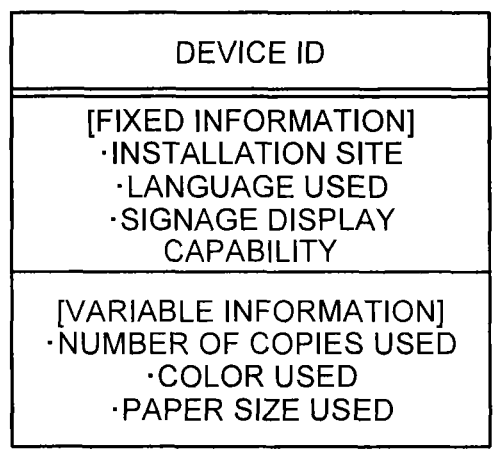
FIG. 7 is a table illustrating an example of electronic apparatus information.

The electronic-apparatus information storage unit 21 stores therein the latest electronic apparatus information for each device ID. FIG. 7 is a table illustrating an example of the electronic apparatus information. The device ID is the information to identify an electronic apparatus. The electronic apparatus information is the information concerning the electronic apparatus and includes fixed information and variable information. The fixed information is, of the information concerning the electronic apparatus, the information that does not vary by the use of the electronic apparatus. For example, the fixed information includes a function installed in the electronic apparatus itself, the capability of electronic apparatus, and the usage environment in which the electronic apparatus is used. Although the usage environment may be changed, it is here handled as the fixed information. In FIG. 7, the installation site, language used, and signage display capability are illustrated as examples of the fixed information.

The variable information is the information that varies by the use of original functions of the electronic apparatus. In FIG. 7, the number of copies used, color used, and paper size used are illustrated as examples of the variable information.

Figure 8:
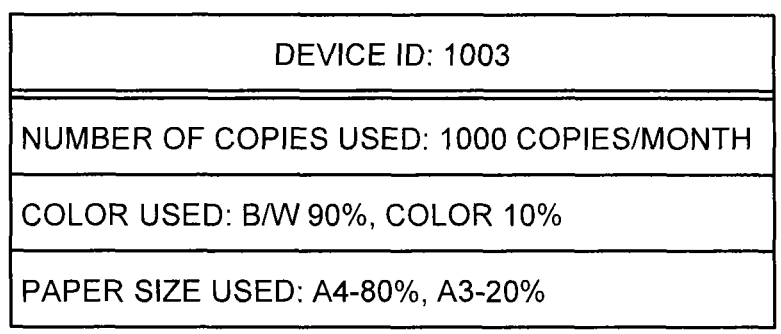
FIG. 8 is a table illustrating a specific example of variable information.

FIG. 8 is a table illustrating a specific example of the variable information. In the example in FIG. 8, a part of the variable information on the MFP 2 is illustrated. The number of copies used represents the number of copies per month, for example. The color used represents respective ratios of black and white and color used, for example. The paper size used represents ratios of respective paper sizes used, for example. In place of ratios, the number of outputs in each color or in each paper size may be used, for example. With the electronic apparatus to which a maintenance contract has been made, for example, these items of the variable information are notified to the content center 1 at regular intervals. The variable information is updated automatically in the content center 1, for example, monthly. Normally, the variable information is used for paper replenishment, charging, and others.

FIG. 9 is a table illustrating a specific example of the fixed information. In the example in FIG. 9, a part of the fixed information on the MFP 2 is illustrated. The installation site is the information indicative of the location at which the electronic apparatus is installed. In the example in FIG. 9, the installation site is indicated by the type (attribute) of location installed such as "apparel office." The installation site is not limited to this.

The language used represents the language (English, Japanese, and other languages) that is used for information display in the electronic apparatus, for example. The signage display capability represents the capability of displaying content. In FIG. 9, the resolution of display (640×400 dots per inch (DPI)), and the number of displayable characters (40 two-byte characters (250 characters by scrolling)) are illustrated as examples of the signage display capability. The fixed information is set in the content center 1 at the time of installing the electronic apparatus, or is notified to the content center 1 at regular intervals together with the variable information.

Referring back to FIG. 6, the condition-list storage unit 22 stores therein a delivery condition list. The delivery condition list is the information indicative of a condition of delivering content (delivery condition) for each piece of content that is the subject of delivery. The delivery condition is not necessary to be in a list form, and it may be in any form.

FIG. 10 is a table illustrating an example of a delivery condition. FIG. 10 illustrates an example of a delivery condition for the content of a catalog A. As illustrated in FIG. 10, the delivery condition is specified as a condition that the electronic apparatus information satisfies, for example. In the example in FIG. 10, the catalog A is delivered to an electronic apparatus, as a target, in which the installation site is apparel office, the language used is English, the signage display capability is 640×400 dots per inch (DPI) or higher, the number of copies used is 1000 copies per month or less, and the color used is color ratio of 60% or higher.

As the paper size used in FIG. 10, there may be the electronic apparatus information not determined as a delivery condition (the electronic apparatus information defined as "not asked"). The delivery condition is not limited to the condition as illustrated in FIG. 10. For example, in place of the delivery condition of delivering content when all of the conditions for the respective electronic apparatus information are satisfied (AND condition), a delivery condition of delivering content when a part of the conditions for the electronic apparatus information for each electronic apparatus is satisfied (OR condition) may be used.

For example, when delivering a piece of advertising content, the condition as to what kind of electronic apparatuses and users are to be the target is specified in the delivery condition. Consequently, the advertising content is to be delivered to the electronic apparatus of the device ID corresponding to the electronic apparatus information that fulfills the delivery condition. Conversely, as for the device ID corresponding to the electronic apparatus information that does not conform to the delivery condition, the advertising content is not delivered. As described later, when the user of an electronic apparatus is identifiable, whether to deliver the content may be determined by using the information on the user.

Referring back to FIG. 6, the content storage unit 23 stores therein the content that is the subject of delivery. The content storage unit 23 stores therein the content in association with the information to identify the content (such as a content number), for example.

The electronic-apparatus information processing unit 24 acquires (receives) electronic apparatus information from the electronic apparatus, and stores the received electronic apparatus information in the electronic-apparatus information storage unit 21 (an acquiring unit).

The condition comparison processing unit 25 serves as a selecting unit that selects the content corresponding to the electronic apparatus information out of one or more pieces of the content. For example, the condition comparison processing unit 25 compares the electronic apparatus information with the delivery condition for each device ID, and if there is a device ID that conforms to the delivery condition, then the condition comparison processing unit 25 issues a delivery request to the content delivery processing unit 26. That is, the content corresponding to the delivery condition, to which the electronic apparatus information conforms, is selected as the content for the electronic apparatus that is a transmission source of the electronic apparatus information. The delivery request includes a device ID, a content number, and related information (such as the delivery period of advertisement).

The content delivery processing unit 26, upon receiving the delivery request, reads out the content to be the subject of delivery from the content storage unit 23, and performs delivery processing on the read-out content.

The network processing unit 27 performs transmission and reception processing on a variety of information via the Internet 5. For example, the network processing unit 27 performs the processing of receiving a notice of electronic apparatus information via the Internet 5 and transmitting the notice to the electronic-apparatus information processing unit 24, and the processing of transmitting the content to deliver to the electronic apparatus of the device ID to be the target by the request from the content delivery processing unit 26.

The various units (the electronic-apparatus information processing unit 24, the condition comparison processing unit 25, the content delivery processing unit 26, the network processing unit 27, and others) of the content center 1 may be implemented by making the processing device such as the CPU 51 execute a computer program, that is, by software, may be implemented by hardware such as an integrated circuit (IC), or may be implemented by using the software and the hardware in combination.

The computer program executed in the content center 1 in the first embodiment is provided, as a computer program product, in a file of an installable format or an executable format recorded on a computer readable recording medium such as a compact-disc read-only memory (CD-ROM), a flexible disk (FD), a compact-disc recordable (CD-R), and a digital versatile disc (DVD).

The computer program executed in the content center 1 in the first embodiment may be configured to be stored on a computer connected to a network such as the Internet and provided by downloading via the network. Furthermore, the computer program executed in the content center 1 in the first embodiment may be configured to be provided or distributed via a network such as the Internet.

The computer program in the first embodiment may be configured to be provided by embedding in a ROM or the like in advance.

The computer program executed in the content center 1 in the first embodiment is modularly configured including the foregoing various units, and as the actual hardware, is configured such that, by reading out and executing the computer program from a storage medium by the CPU 51, the above-described various units are loaded on a main storage device and the various units are to be generated on the main storage device.

Next, the processing of delivering content will further be described. The condition comparison processing unit 25, by using the electronic apparatus information as the variable information on an electronic apparatus, selects the content to deliver. Consequently, the content can be delivered timely in response to the usage of the appropriate electronic apparatus.

The content delivery processing unit 26 may determine the content to deliver by using the information on the user of the electronic apparatus in place of or together with the electronic apparatus information. For example, if the authority of the user (whether the user is an administrator) is identifiable, then the content delivery processing unit 26 may select and deliver the content different for each identified authority. For example, it is possible to display managing functions within a catalog preferentially if the user is an administrator, and to display convenient functions within the catalog preferentially if the user is not an administrator. If it is possible to acquire up to a use situation for each user, then the content delivery processing unit 26 may select and deliver different content in response to the use situation. For example, it can be determined to display a new function in color printing in the catalog preferentially if it is a user who mostly uses color printing, to display a new reduction function in the catalog preferentially if it is a user who mostly uses a reduction function, and to display a new sorting function preferentially if it is a user who mostly uses a sorting function. Consequently, the content that is more useful for the viewer can be delivered.

Figures 11, 12:
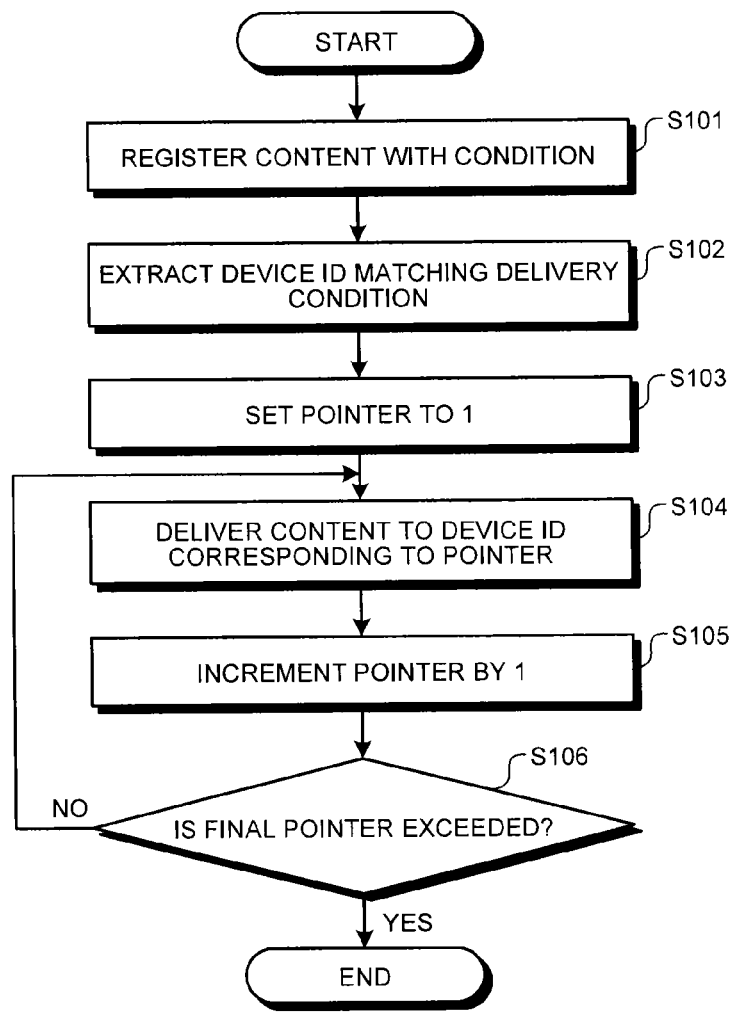
FIG. 11 is a table for explaining an example of selection processing of advertising content.
FIG. 12 is a flowchart illustrating the selection processing performed in the content center.

FIG. 11 is a table for explaining an example of selection processing of advertising content. New models A to C are examples of content, which is managed by the content center 1, to advertise new MFP models. To make the explanation simple, it is assumed that there are three types A to C of advertising content (digital information composed of images and text for electronic distribution) corresponding to the number of copies used. It is further assumed that only the number of copies used is determined as the delivery condition. For example, the new model A is the advertising content for a small scale MFP in which the number of copies used is "99 copies per month or less." The new model B is the advertising content for a medium scale MFP in which the number of copies used is "100 to 9999 copies per month." The new model C is the advertising content for a large scale MFP in which the number of copies used is "10000 copies per month or more." In this case, because the electronic apparatus of the device ID of 1003 uses 1000 copies per month (see FIG. 8), the content delivery processing unit 26 determines that it is appropriate to deliver the content for the new model B for the electronic apparatus of the device ID of 1003.

FIG. 12 is a flowchart illustrating an example of selection processing. The selection processing is the processing to select an electronic apparatus that is the target of delivering content and to deliver the content. In the following description, the processing for a single content registered will be described. When a plurality of pieces of content are registered, the same processing is performed on each piece of the content. The timing of performing the selection processing is arbitrary, and thus it can be configured to perform the selection processing at the timing instructed by the administrator, or each time a given period of time elapses.

First, the content center 1 registers content in the content storage unit 23 and registers a delivery condition of the content in the condition-list storage unit 22 (Step S101). That is, in the content center 1, the content to be delivered first is registered together with the delivery condition (in the example in FIG. 11, the catalog content associated with the number of copies used).

The condition comparison processing unit 25 extracts a device ID that matches the delivery condition of the content from the electronic-apparatus information storage unit 21 (Step S102). The condition comparison processing unit 25 may manage n pieces (n being an integer of one or greater) of device IDs extracted in association with pointers 1 to n. FIG. 13 is a table illustrating an example of a list of extracted device IDs. In FIG. 13, illustrated is an example of six pieces (n=6) of device IDs extracted.

The content delivery processing unit 26 sets the pointer to one (Step S103). The content delivery processing unit 26 delivers content to the electronic apparatus of the device ID corresponding to the current pointer (Step S104). In the example in FIG. 13, the content is delivered to the electronic apparatus of the device ID=1003. The content delivery processing unit 26 increments (+1) the pointer (Step S105). The content delivery processing unit 26 determines whether the current pointer exceeded the final pointer (Step S106). If not exceeded (No at Step S106), then the procedure returns to Step S104 and the processing is repeated. In the example in FIG. 13, when the pointer comes to two, the content delivery processing unit 26 delivers content to the electronic apparatus of the device ID=1124 corresponding to the pointer two.

If the current pointer exceeded the final pointer (Yes at Step S106), then the selection processing is finished. In the case of the example in FIG. 13, because the pointer is up to six, the selection processing is finished at the time the pointer reaches seven by the increments.

Next, a second embodiment in which an electronic apparatus is a projector 31 will be described. FIG. 14 is a schematic diagram illustrating an example of the overall configuration of a signage system according to the second embodiment. The signage system is configured with the content center 1, the normal projector 31, and a short-focus projector 32 being connected to one another via the Internet 5.

In the second embodiment, the projector 31 is installed inside a meeting room 33. In the meeting room 33, installed is a Bluetooth (registered trademark) module 34, for example, on a ceiling. The Bluetooth module 34 is a module to perform communication conforming to Bluetooth with apparatuses. The Bluetooth module 34 stores therein an ID that identifies the meeting room 33, and the information concerning the size of the meeting room (for example, the area and seating capacity of the meeting room). The projector 31 in the second embodiment includes a Bluetooth communication unit 35 and a focusing lens 36. The Bluetooth communication unit 35 performs communication conforming to Bluetooth. The short-focus projector 32 includes a focusing lens 37.

The projectors 31 and 32 each store, in an internal memory, a utilization site, or the related information that is linked to the utilization site, and transmit it to the content center 1 at regular intervals. The content center 1 selects, with the attribute of a utilization site used often as a condition, an electronic apparatus (projector) to which advertising content is delivered. For example, the content center 1 selects an electronic apparatus to which advertising content concerning a normal projector model or a short-focus model is delivered, depending on the respective sizes of the meeting room used often.

As in the foregoing, in the second embodiment, with the utilization site of the electronic apparatus as the delivery condition, the electronic apparatus to which content is delivered is selected. As the delivery condition, the same condition as that in the first embodiment may be used. Alternatively, the same condition as the delivery condition in the second embodiment may be used in the first embodiment.

The following describes two examples of identifying the utilization site (meeting room) used. A first identifying example is an example to identify a meeting room in which the normal projector 31 is used often. A second identifying example is an example to identify a meeting room in which the short-focus projector 32 is used often.

First Identifying Example

FIG. 15 is a table illustrating an example of determining information for determining (identifying) a meeting room for a normal projector 31. FIG. 16 is a table illustrating an example of electronic apparatus information transmitted from the normal projector.

When the power for the projector 31 is turned on, the Bluetooth communication unit 35 starts a connection sequence. In Bluetooth, an inquiry procedure in which device information within a communication range is exchanged is defined. The Bluetooth communication unit 35, by executing the inquiry procedure, receives an ID of the meeting room 33 and information concerning the size of the room and stores them in an internal non-volatile memory or the like. Each time the power is turned on, the projector 31 increments the counter of the received ID by one and updates the stored counter.

FIG. 16 is a table illustrating an example of the counter stored. In FIG. 16, illustrated is an example in which the name of a meeting room (such as "paulownia room") is defined as the ID of the meeting room. The projector 31 transmits the value of the counter stored in this way for each meeting room to the content center 1 at regular intervals.

The content center 1 stores, for example, the determining information in which the ID of the meeting room 33 is associated with the size (large, medium, small) of the meeting room 33, in the electronic-apparatus information storage unit 21 as illustrated in FIG. 15.

The electronic apparatus information transmitted from the projector 31 to the content center 1, as illustrated in FIG. 16, includes the ID of the meeting room and the number of use thereof. The content center 1 stores the received electronic apparatus information as illustrated in FIG. 16 in the electronic-apparatus information storage unit 21.

Meanwhile, it is assumed that "delivery to an apparatus in which the use ratio of the "small" as the size of meeting room used is the most" is specified as a delivery condition to deliver a catalog for a short-focus model as advertising content. In this case, if it is the electronic apparatus of the device ID=2003 illustrated in FIG. 16, because the "large" is 2 times, the "medium" is 5 times (3 times+2 times), and the "small" is 20 times, the use ratio of the "small" is the most. Because it matches the foregoing delivery condition, a delivery request is issued to the electronic apparatus of the device ID=2003. The delivery request includes the device ID of the appropriate projector, the content number (corresponding to catalog advertising number of the short-focus model), and related information (such as the delivery period of advertisement). The content delivery processing unit 26, upon receiving the delivery request, selects content to be the subject of delivery from the content storage unit 23 and performs delivery processing of the selected content.

Second Identifying Example

Figures 18, 19:
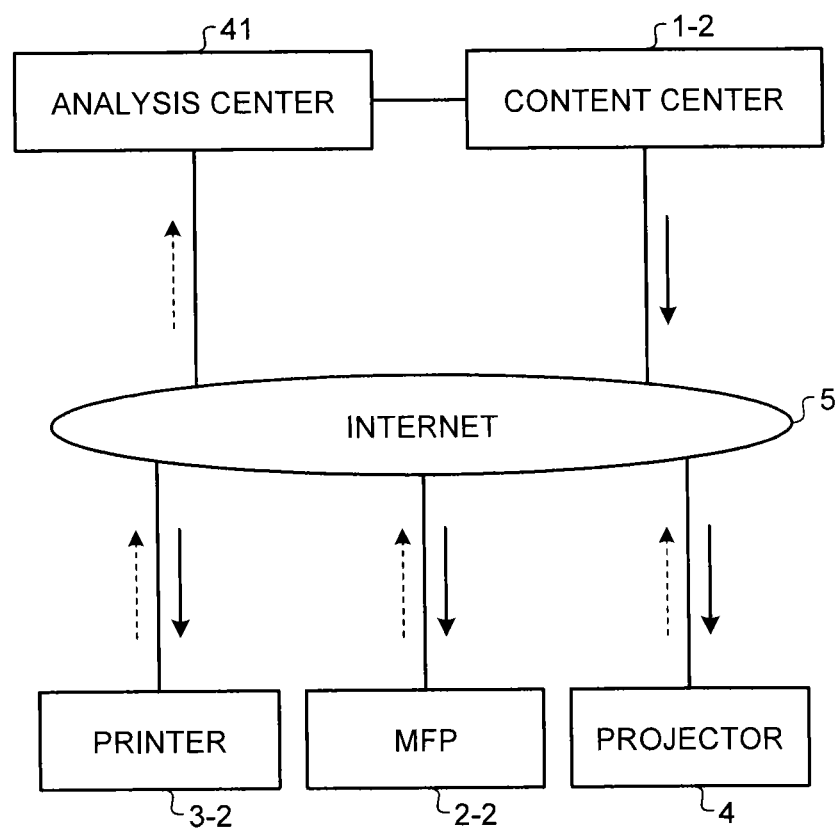
FIG. 18 is a table illustrating an example of electronic apparatus information transmitted from the short-focus projector.
FIG. 19 is a schematic diagram illustrating an example of the overall configuration of a signage system according to a first modification.

FIG. 17 is a table illustrating an example of determining information for determining (identifying) a meeting room for the short-focus projector 31. FIG. 18 is a table illustrating an example of electronic apparatus information transmitted from the short-focus projector.

In the second identifying example, the size of the meeting room is identified by the size of the screen. In general, a video is projected on a large screen in a large meeting room and is projected on a small screen in a small meeting room. Furthermore, the size of the screen is linked with the position of the focusing lens 37. Consequently, the value indicative of the position of the focusing lens for focusing, for example, an angle indicative of how far the focusing lens 37 was rotated, is transmitted to the content center 1 at regular intervals. The content center 1 refers to the received information on the angle and to the determining information as in FIG. 17, and identifies the size of the meeting room.

The distance to a screen assumed from the rotation angle of the focusing lens 37 is determined as product specifications. Thus, in the content center 1 at the stage in which the product is brought to the market, the determining information as in FIG. 17 has already been readied. That is, the content center 1 keeps the determining information as in FIG. 17 stored, for example, in the electronic-apparatus information storage unit 21.

Meanwhile, on the short-focus projector 32 side, it is assumed that the focus has already been adjusted after a given time elapsed (for example, 10 minutes later) from the power on. The short-focus projector 32 then stores the rotation angle after the given time elapsed (10 minutes later) from the power on in an internal memory or the like of the short-focus projector 32. The short-focus projector 32 further stores, for each range of rotation angles, the value of a counter indicating the number of times it was adjusted to a rotation angle within the range. Consequently, each time the power is turned on, a counter for any one of the ranges of rotation angles is to be counted up by one. In FIG. 18, indicated is an example of the respective values of counters for three ranges ("0 to 29 degrees", "30 to 89 degrees", "90 degrees or greater").

To check the recent use situation, the count may be cleared (being turned into zero) for each elapse of a given period of time. For example, if the transmission of electronic apparatus information to the content center 1 is once a month, then all of the counters may be set to zero after the transmission.

The electronic apparatus information as illustrated in FIG. 18 is transmitted from the short-focus projector 32 to the content center 1. In this example, in the recent one month, the number of times of 0 to 29 degrees (20 times) is the most. With this, when based on the determining information in FIG. 17, it can tell that the electronic apparatus of device ID=2003 is most used in a small meeting room. Consequently, when "delivery to an apparatus in which the use ratio of the "small" as the size of meeting room used is the most" is specified as a delivery condition to deliver the catalog for the short-focus model as advertising content, the electronic apparatus of device ID=2003 matches this condition. The content center 1 then delivers the appropriate advertising content to the electronic apparatus of device ID=2003.

First Modification

In the above-described embodiments, the content center 1 delivers the content to each electronic apparatus (push type). In a first modification, each electronic apparatus acquires the content selected for the apparatus itself from the content center 1 (pull type).

FIG. 19 is a schematic diagram illustrating an example of the overall configuration of a signage system according to the first modification. The signage system in the first modification is different from the signage system illustrated in FIG. 1, in that the configurations of a content center 1-2, an MFP 2-2, and a printer 3-2 are different and it further includes an analysis center 41. The other constituent elements have configurations the same as those in FIG. 1 and thus are given with the same reference numerals, and their explanations are omitted.

The analysis center 41 acquires and analyzes electronic apparatus information from each electronic apparatus, and performs the processing of remote maintenance management, charging, and others. The content center 1-2 manages the delivery of advertising content for an electronic apparatus selected based on the electronic apparatus information managed by the analysis center 41. As just described, in the first modification, a system that manages the electronic apparatus information (the analysis center 41) and a system that manages the delivery of content (the content center 1-2) are made to be separate and to be operable asynchronously. The analysis center 41 and the content center 1-2 can logically and physically be separated and operated. Alternatively, the analysis center 41 and the content center 1-2 may be configured without being separated, as the same as that in the foregoing embodiments.

The content center 1-2 in the first modification acquires the electronic apparatus information on each electronic apparatus from the analysis center. The content center 1-2 further stores corresponding information in which an electronic apparatus to be the subject of delivery is associated with content to deliver, in place of delivering the content to the electronic apparatus to be the subject of delivery selected based on the electronic apparatus information (push type). The corresponding information is stored in a storage unit such as the HDD 54, for example. Each electronic apparatus can acquire (download) the content associated with the apparatus itself, by referring to the corresponding information (pull type). It may be configured to deliver content in a method designated out of the push type and the pull type.

The corresponding information may be in any form. For example, the corresponding information in which the access information such as a uniform resource locator (URL) for accessing the content to deliver is associated with can be used, for each device ID of the electronic apparatus. Each electronic apparatus can acquire the access information corresponding to the device ID of the apparatus itself and download the content from the storage place indicated by the acquired access information.

The MFP 2-2 and the printer 3-2 are different from the MFP 2 and the printer 3 in the foregoing embodiments in that a function to acquire (download), from the content center 1-2, the content of which the apparatus itself is the subject of delivery, is provided. The projector 4 may be configured to have the same function.

Figure 20:
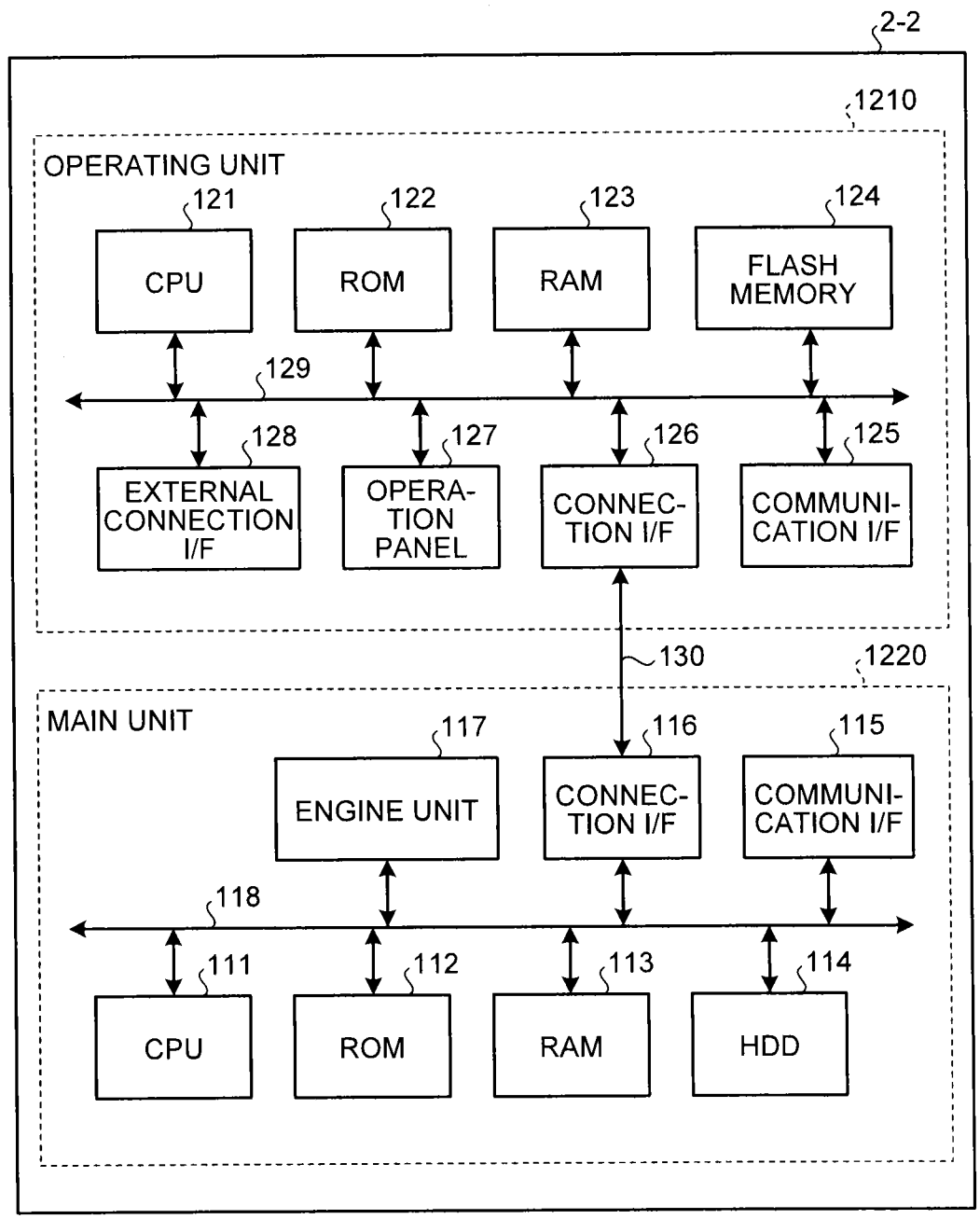
FIG. 20 is a block diagram illustrating an example of the hardware configuration of an MFP in the first modification.

FIG. 20 is a block diagram illustrating an example of the hardware configuration of the MFP 2-2 in the first modification. The printer 3-2 can have the same configuration as that in FIG. 20.

As illustrated in FIG. 20, the MFP 2-2 includes a main unit 1220 that is capable of implementing various functions such as a copying function, a scanner function, a facsimile function, and a printer function, and an operating unit 1210 that receives the operation of the user. To receive the operation of the user is a concept that includes the receiving of information input in response to the operation of the user (including, for example, a signal representing coordinate values of a screen).

The main unit 1220 and the operating unit 1210 are connected to be able to perform communication with each other via a dedicated communication path 130. While the communication path 130 can use one that is of universal serial bus (USB) standard, for example, it may be of any standard regardless of being wired or wireless.

The main unit 1220 can perform operation in response to the operation received by the operating unit 1210. The main unit 1220 is capable of performing communication with an external device such as a client personal computer (PC) and can further perform operation in response to instructions received from the external device.

The hardware configuration of the main unit 1220 will be described first. As illustrated in FIG. 20, the main unit 1220 includes a CPU 111, a ROM 112, a RAM 113, an HDD 114, a communication I/F 115, a connection I/F 116, and an engine unit 117, and the foregoing are connected to one another via a system bus 118.

The CPU 111 comprehensively controls the operation of the main unit 1220. The CPU 111 controls the operation of the main unit 1220 overall by executing a computer program stored in the ROM 112 or the HDD 114 with the RAM 113 as a work area, and implements the various functions such as the copying function, the scanner function, the facsimile function, and the printer function in the foregoing.

The communication I/F 115 is an interface to connect to the Internet 5. The connection I/F 116 is an interface to perform communication with the operating unit 1210 via the communication path 130.

The engine unit 117 is the hardware that performs processing other than generalized information processing and communication, to implement the copying function, the scanner function, the facsimile function, and the printer function. The MFP 2-2 includes a scanner unit (an image-reading unit) that scans and reads an image of a document, a plotter unit (an image forming unit) that performs printing to a sheet member such as paper, and a facsimile unit that performs facsimile communication, for example. The MFP 2-2 can further include specific options such as a finisher that sorts the printed sheet members and an automatic document feeder (ADF) that automatically feeds documents.

Next, the hardware configuration of the operating unit 1210 will be described. As illustrated in FIG. 20, the operating unit 1210 includes a CPU 121, a ROM 122, a RAM 123, a flash memory 124, a communication I/F 125, a connection I/F 126, an operation panel 127, and an external connection I/F 128, and the foregoing are connected to one another via a system bus 129.

The CPU 121 comprehensively controls the operation of the operating unit 1210. The CPU 121 controls the operation of the operating unit 1210 overall by executing a computer program stored in the ROM 122 or the flash memory 124 with the RAM 123 as a work area, and implements various functions such as display of the information (images) in response to the input received from the user.

The communication I/F 125 is an interface to connect to the Internet 5. The connection I/F 126 is an interface to perform communication with the main unit 1220 via the communication path 130. The external connection I/F 128 is an interface to connect to an external device connected to the MFP 2-2.

The operation panel 127 receives a variety of input in response to the operation of the user and displays a variety of information (for example, the information in response to the operation received, the information representing an operating status of the MFP 2-2, and the information representing a setting condition and others). While the operation panel 127 is configured with a liquid crystal display device (LCD) in which a touch panel function is implemented in this example, it is not limited to this. For example, it may be configured with an organic EL display device in which a touch panel function is implemented. Furthermore, in addition to or in place of this, an operating unit such as hardware keys and a display unit such as lamps may be provided.

Figure 21:
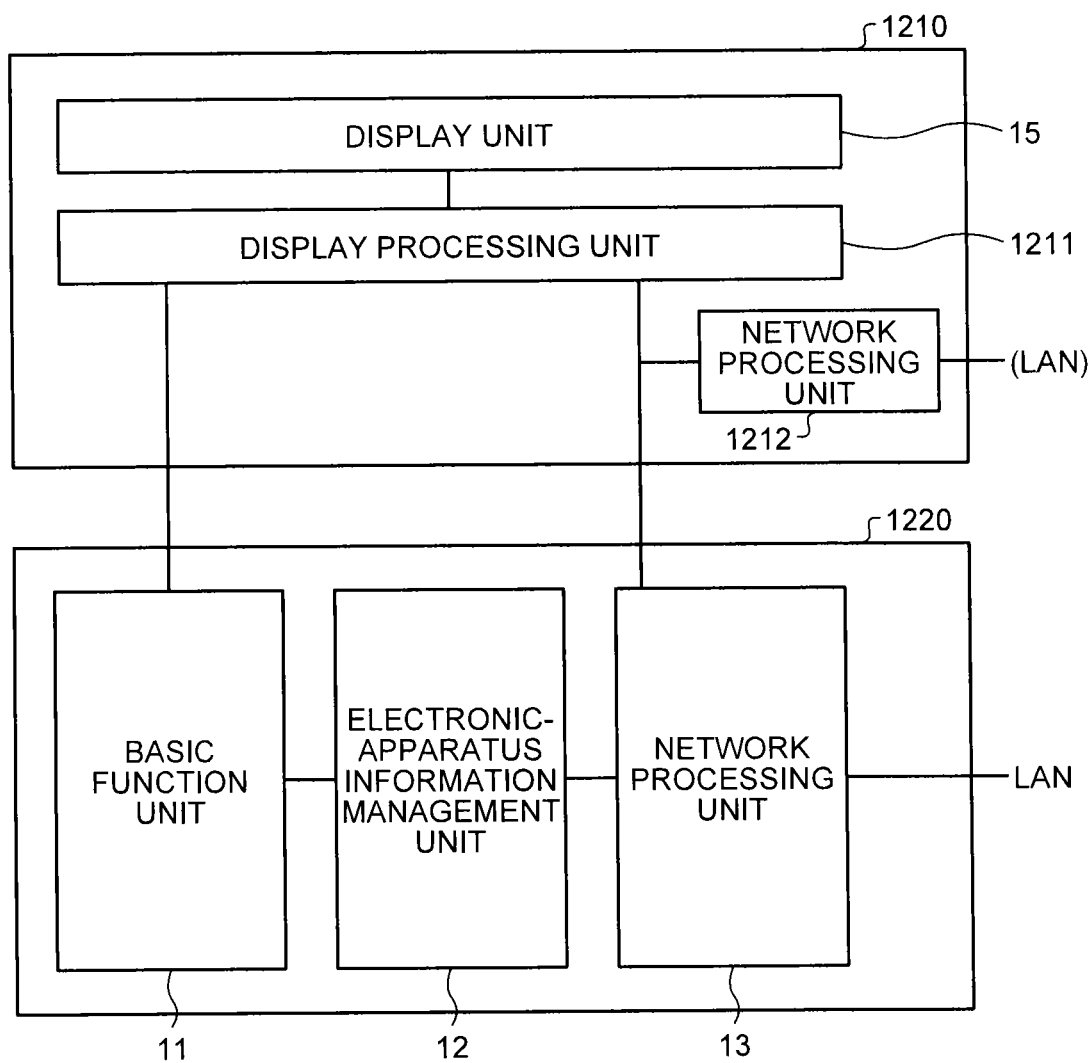
FIG. 21 is a block diagram illustrating an example of the configuration of the MFP in the first modification.

FIG. 21 is a block diagram illustrating an example of the configuration of the MFP 2-2 in the first modification. The main unit 1220 of the MFP 2-2 includes the basic function unit 11, the electronic-apparatus information management unit 12, and the network processing unit 13. The operating unit 1210 of the MFP 2-2 includes a display processing unit 1211, a network processing unit 1212, and the display unit 15. The constituent elements the same as those in FIG. 5 are given with the same reference numerals and their explanations are omitted.

The display processing unit 1211 controls the display of a variety of information (such as content) for the display unit 15. For example, the display processing unit 1211, in response to the instructions given from the basic function unit 11 of the main unit 1220, displays the information concerning the operation of the main unit 1220 on the display unit 15. The display processing unit 1211, in response to the instructions given from the network processing unit 1212, further displays the content downloaded from, for example, the content center 1-2 on the display unit 15. The display processing unit 1211 displays the received content on the display unit 15 after processing the content into a format displayable on the display unit 15, as necessary. When the content cannot be processed on the electronic apparatus side, the content center 1-2 may be configured to refer to the display performance and others of the electronic apparatus and process the content.

The network processing unit 1212 controls the communication between the operating unit 1210 and a network such as the Internet 5. For example, the network processing unit 1212 downloads the content of which the MFP 2-2 itself is the subject of delivery, from the content center 1-2.

As in the foregoing, in the first modification, the operating unit 1210 alone can perform communication with an external network, without going through the main unit 1220. It may be configured, without providing the network processing unit 1212 in the operating unit 1210, to perform communication with an external network (the content center 1-2 and others) through the network processing unit 13 of the main unit 1220.

Figure 22:
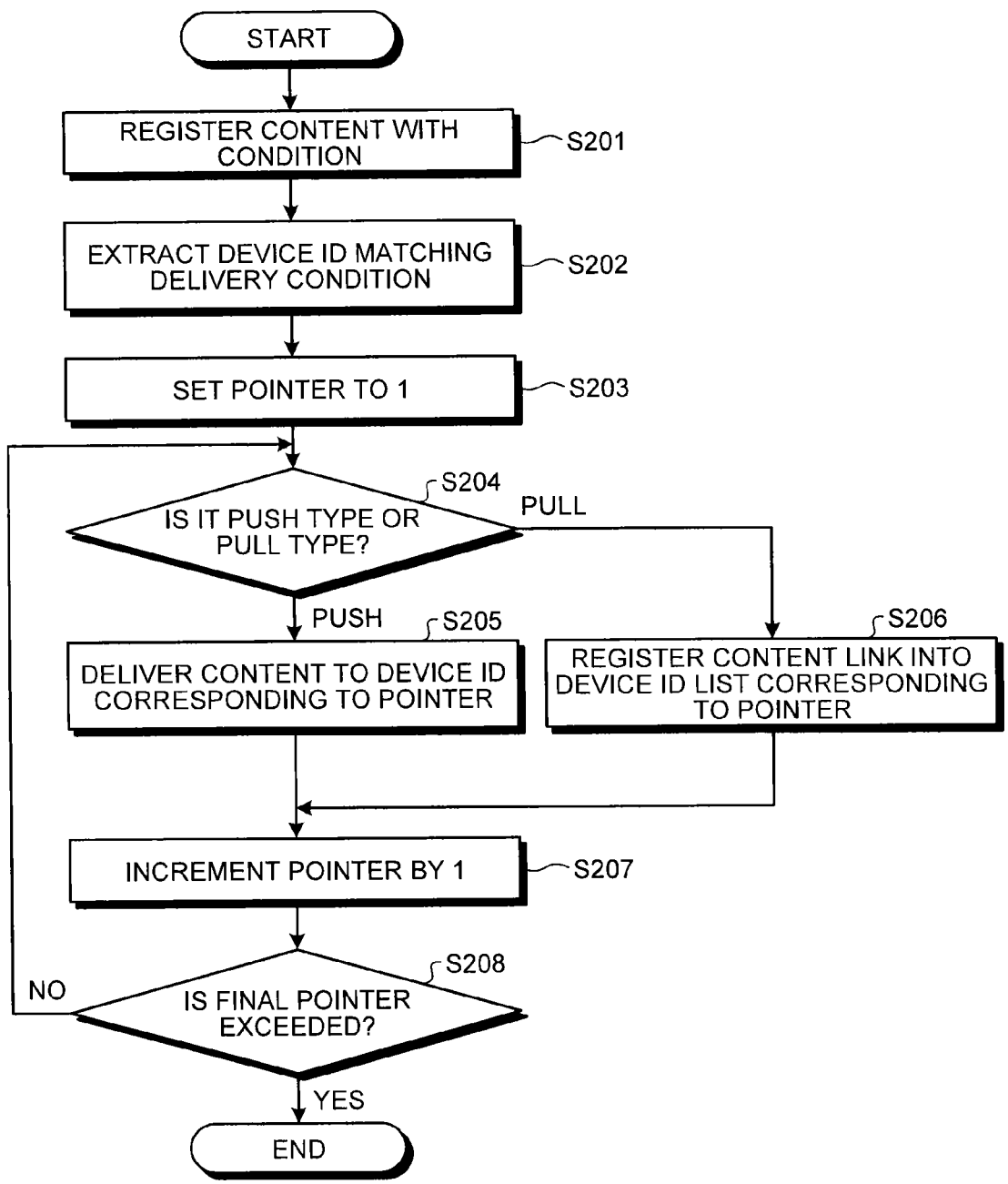
FIG. 22 is a flowchart illustrating an example of selection processing performed in the first modification.

FIG. 22 is a flowchart illustrating an example of selection processing performed in the first modification. In the following description, the way in which content is delivered by a method designated out of the push type and the pull type will be described.

The processes performed at Step S201 to Step S203 are the same as those at Step S101 to Step S103 in FIG. 3, and thus their explanations are omitted.

The content delivery processing unit 26 of the content center 1-2 determines whether the designation is a push type or a pull type (Step S204). If it is the push type (PUSH at Step S204), then the content delivery processing unit 26 delivers content to the electronic apparatus of the device ID corresponding to the current pointer (Step S205). If it is the pull type (PULL at Step S204), then the content delivery processing unit 26 stores (registers) the content access information into a device ID list of the device ID corresponding to the current pointer (Step S206). The device ID list is the corresponding information in which the access information for each device ID is stored.

The content delivery processing unit 26 increments (+1) the pointer (Step S207). The content delivery processing unit 26 determines whether the current pointer exceeded the final pointer (Step S208). If not exceeded (No at Step S208), then the procedure returns to Step S204 and the processing is repeated. If the current pointer exceeded the final pointer (Yes at Step S208), the selection processing is finished.

FIG. 23 is a table illustrating an example of a device ID list (corresponding information). FIG. 23 illustrates an example of the device ID list, for the device ID=1003, which describes the URLs of content A, V, and Z selected by satisfying the delivery condition. The electronic apparatus of device ID=1003 accesses the content center 1-2, acquires URLs corresponding to the device ID of the apparatus itself in the device ID list, and then downloads content from the URLs and displays the content.

Figure 24:
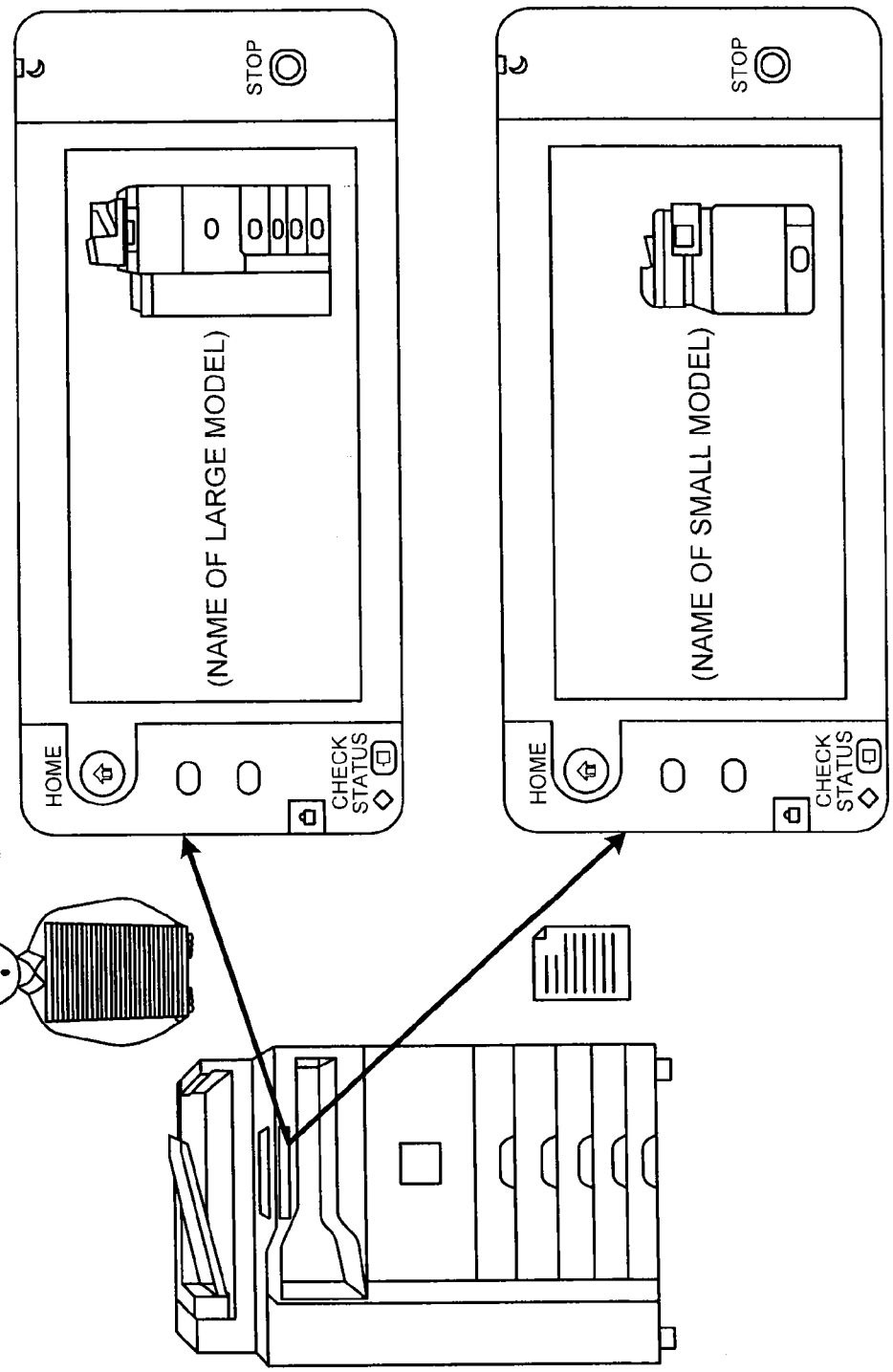
FIG. 24 is a diagram illustrating examples of content display corresponding to the use situation of an MFP.

Next, examples of content displayed will be described. FIG. 24 is a diagram illustrating examples of content display corresponding to the use situation of an MFP (MFP 2, 2-2). When the number of copies used on the MFP is great, an advertisement for a large model (the screen at upper right) is displayed, and when the number of copies used is small, an advertisement for a small model (the screen at lower right) is displayed.

Figure 25:
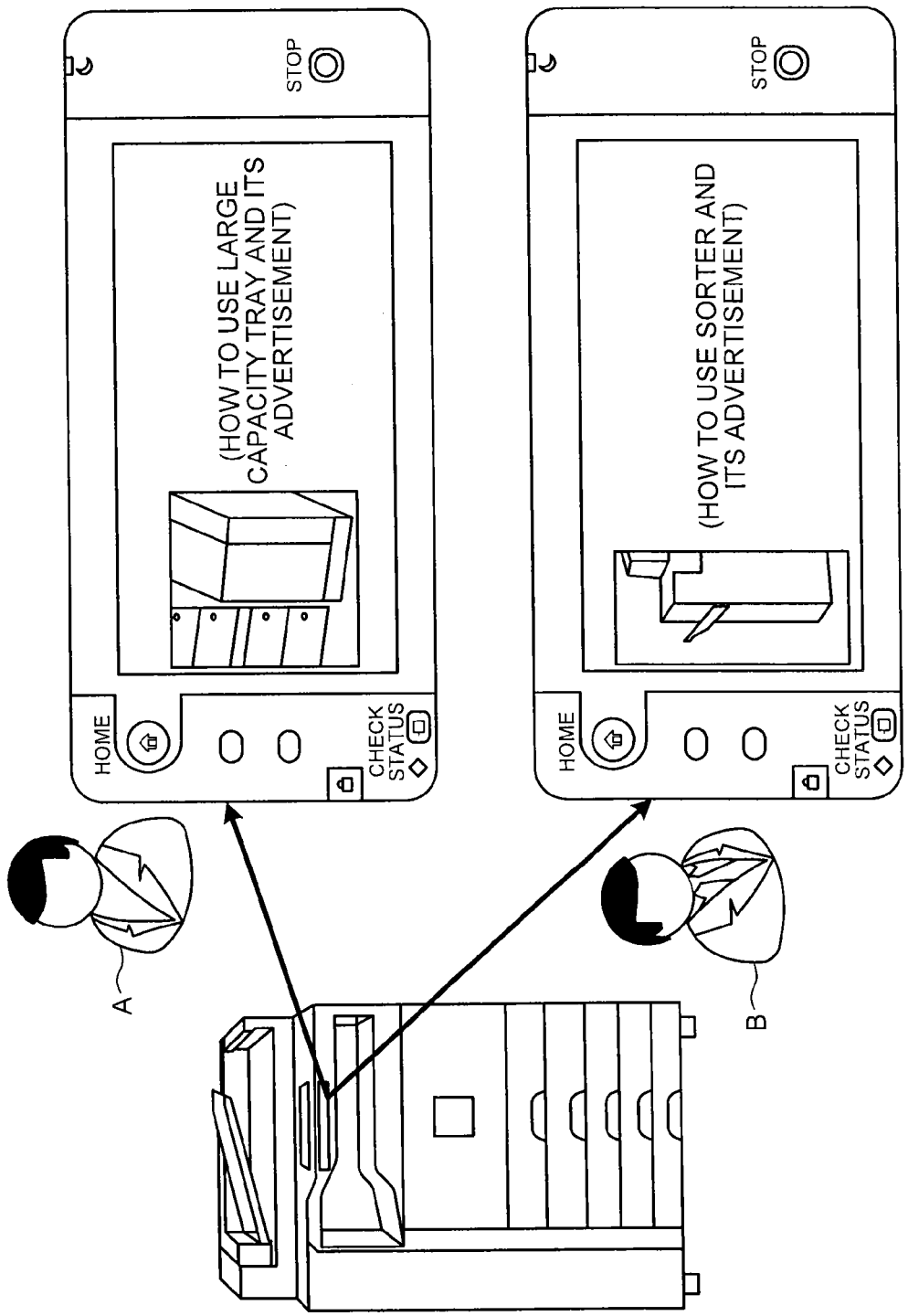
FIG. 25 is a diagram illustrating examples of content display also corresponding to the use situation of an individual.

FIG. 25 is a diagram illustrating examples of content display corresponding to not only the use situation of an MFP (MFP 2, 2-2) but also the use situation of an individual. When it can be identified that the number of copies used by a user A is great, how to use a large capacity tray and its advertisement are displayed on the screen (the screen at upper right). When it can be identified that a user B mostly uses a sort function, how to use a sorter and its advertisement are displayed on the screen. In the latter case, the content display is the information effective for that user only. Consequently, it may be configured such that it is displayed only when the user is logging in from the panel of the electronic apparatus, for example.

Figure 26:
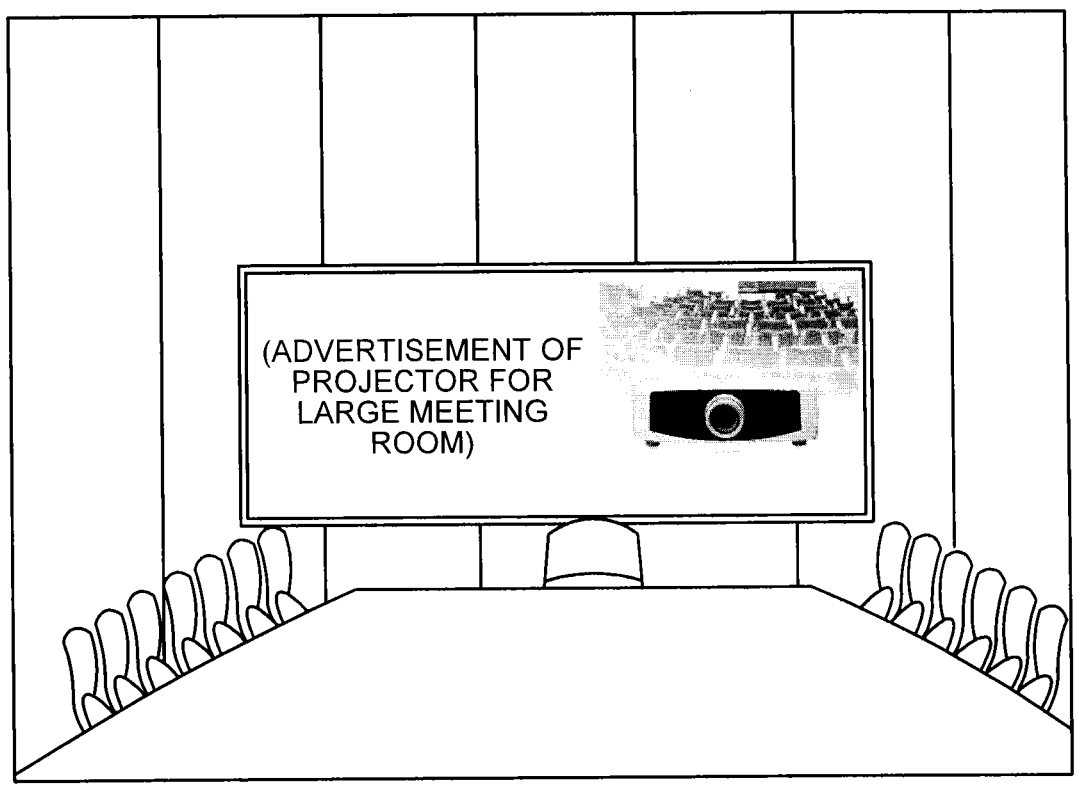
FIG. 26 is a diagram illustrating an example of content display corresponding to the use situation of a projector.
Figure 27:
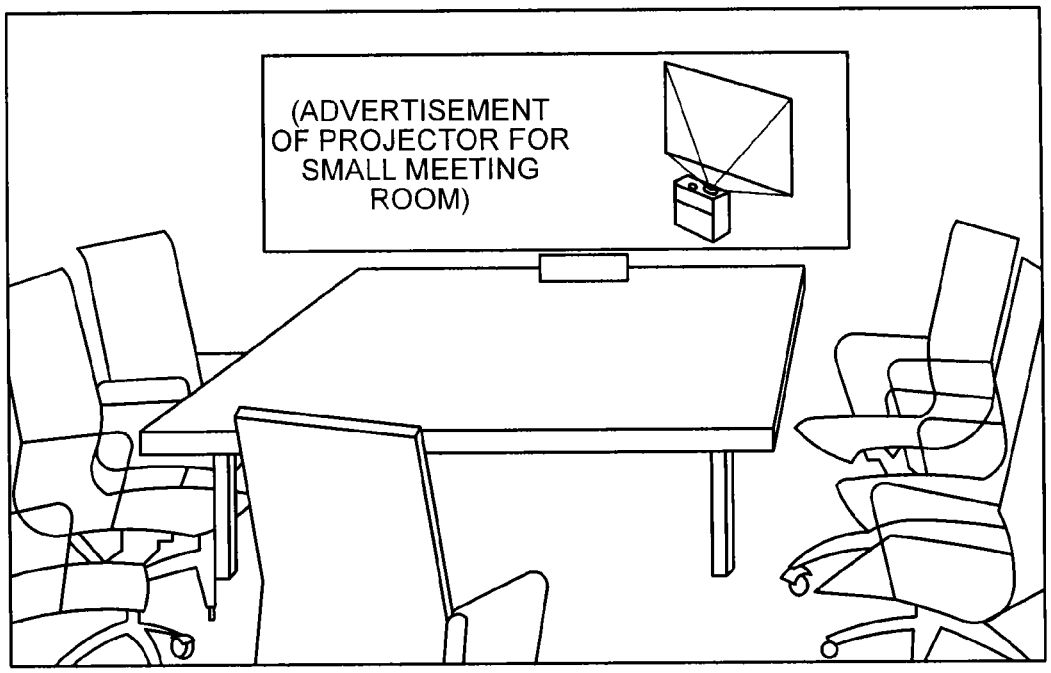
FIG. 27 is a diagram illustrating an example of content display corresponding to the use situation of a projector.

FIGS. 26 and 27 are diagrams illustrating examples of content display corresponding to the use situation of a projector (projector 4, 31, 32). FIG. 26 is an example of displaying an advertisement for a projector for a large meeting room from a projector that is mostly used in a large meeting room. FIG. 27 is an example of displaying an advertisement for a projector for a small meeting room from a projector that is mostly used in a small meeting room.

FIG. 28 is a diagram illustrating an example of the data structure of content. FIG. 28 illustrates an example of content in an Extensible Markup Language (XML) format used in HyperText Markup Language (HTML). The data structure of content is not limited to this.

As illustrated in FIG. 28, the content includes characters (text) and an image (a moving image or a still image), for example. It may be configured such that the content related information such as display period, display time, and display timing can be added to the content. In the example in FIG. 28, during the period from Jan. 1, 2014 to Jan. 15, 2014 inclusive, the characters of "New Year Sale has started" and a still image are displayed on the electronic apparatus. The content related information can be configured to be processed on the electronic apparatus side (the display processing unit 14 or the display processing unit 1211). In the example in FIG. 28, the display processing unit 14 or the display processing unit 1211 executes control such that the content is displayed from Jan.

1, 2014 to Jan. 15, 2014 in accordance with a clock of the electronic apparatus. The display processing unit 14 or the display processing unit 1211 may autonomously (regardless of a request from the content center) delete the information including the image subsequent to Jan. 15, 2014.

In accordance with the embodiments, a signage function and an electronic-apparatus information notifying function are provided on a given electronic apparatus, and based on the electronic apparatus information on the electronic apparatus, the content to deliver to the electronic apparatus can be determined. Consequently, without imposing a special burden on a viewer, the probability of delivering information considered useful for the viewer can be improved.

The above-described embodiments are examples illustrating the preferred embodiments of the present invention. The invention is not limited to the embodiments, and various modifications can be made without departing from the scope and spirit of the invention.

In accordance with an embodiment, the useful information for viewers can be provided more effectively.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A delivery control apparatus that is connected to an electronic apparatus, the delivery control apparatus comprising:
   circuitry configured to:
   acquire electronic apparatus information corresponding to the electronic apparatus from the electronic apparatus;
   select delivery information corresponding to the electronic apparatus information out of one or more pieces of delivery information, the delivery information being selected based on a match between the electronic apparatus information and a delivery condition corresponding to the delivery information for delivering the delivery information; and
   execute at least one of processing of delivering the selected delivery information to the electronic apparatus and processing of storing access information corresponding to the selected delivery information.

2. The delivery control apparatus according to claim 1, wherein the circuitry is configured to store corresponding information, in which identification information of the electronic apparatus is associated with the access information, in a memory.

3. The delivery control apparatus according to claim 1, wherein the electronic apparatus information includes variable information that varies by use of the electronic apparatus and fixed information that does not vary by the use of the electronic apparatus.

4. The delivery control apparatus according to claim 3, wherein the variable information includes information on a user.

5. An information delivery system comprising:
   a delivery control apparatus; and
   an electronic apparatus,
   the delivery control apparatus comprising:
      circuitry configured to:
      acquire electronic apparatus information corresponding to the electronic apparatus from the electronic apparatus,
      select delivery information corresponding to the electronic apparatus information out of one or more pieces of delivery information, the delivery information being selected based on a match between the electronic apparatus information and a delivery condition corresponding to the delivery information for delivering the delivery information, and
      execute at least one of processing of delivering the selected delivery information to the electronic apparatus and processing of storing access information corresponding to the selected delivery information,
   and the electronic apparatus comprising:
      another circuitry configured to:
      transmit the electronic apparatus information to the delivery control apparatus,
      receive the delivery information from the delivery control apparatus, and
      display the received delivery information on a display.

6. An information delivery method executed in an information delivery system that comprises a delivery control apparatus and an electronic apparatus, the information delivery method comprising:
   transmitting, by the electronic apparatus, electronic apparatus information to the delivery control apparatus;
   acquiring, by the delivery control apparatus, the electronic apparatus information corresponding to the electronic apparatus from the electronic apparatus;
   selecting, by the delivery control apparatus, delivery information corresponding to the electronic apparatus information out of one or more pieces of delivery information, the delivery information being selected based on a match between the electronic apparatus information and a delivery condition corresponding to the delivery information for delivering the delivery information;
   executing, by the delivery control apparatus, at least one of processing of delivering the selected delivery information to the electronic apparatus and processing of storing access information corresponding to the selected delivery information;
   receiving, by the electronic apparatus, the delivery information from the delivery control apparatus; and
   displaying, by the electronic apparatus, the received delivery information on a display.

* * * * *